United States Patent
Chambers et al.

[15] 3,642,389
[45] Feb. 15, 1972

[54] AIR MOTOR ROTOR ASSEMBLY

[72] Inventors: William W. Chambers, Baltimore; David J. Heston, Glen Arm, both of Md.

[73] Assignee: The Black and Decker Manufacturing Company, Towson, Md.

[22] Filed: Oct. 1, 1969

[21] Appl. No.: 862,901

[52] U.S. Cl. ............................ 418/107, 173/163, 308/189.1
[51] Int. Cl. ........................................................ F01c 19/00
[58] Field of Search ............... 418/107, 131, 133, 134, 135, 418/173; 173/12, 163; 308/189, 207

[56] References Cited

UNITED STATES PATENTS

| | | | |
|---|---|---|---|
| 617,671 | 1/1899 | Coldwell | 308/189.1 |
| 638,853 | 12/1899 | Snyder | 418/134 |
| 1,279,268 | 9/1918 | Coldwell | 308/189.1 |
| 1,422,946 | 7/1922 | Egersdorfer | 418/134 X |
| 2,294,805 | 9/1942 | Robinson | 418/107 |
| 2,781,027 | 2/1957 | Henry | 92/122 |
| 3,043,274 | 7/1962 | Quackenbush | 173/163 |
| 3,053,236 | 9/1962 | Self et al. | 92/125 |
| 3,097,571 | 7/1963 | Kaman | 173/163 X |
| 3,123,338 | 3/1964 | Borden | 415/503 X |
| 3,295,262 | 1/1967 | Brown | 173/163 X |

*Primary Examiner*—Martin P. Schwadron
*Assistant Examiner*—Irwin C. Cohen
*Attorney*—Leonard Bloom and Joseph R. Slotnik

[57] ABSTRACT

A portable pneumatic tool including a rigid housing and pendant handle. A rotary vane-type motor including a rotor is disposed within the housing and is powered by compressed air delivered through the handle. A trigger on the handle controls the flow of air to the motor and an output spindle, driven by the motor, is adapted to have rotary tool means secured thereto, an external member is used to adjust rotor clearance within the motor.

9 Claims, 8 Drawing Figures

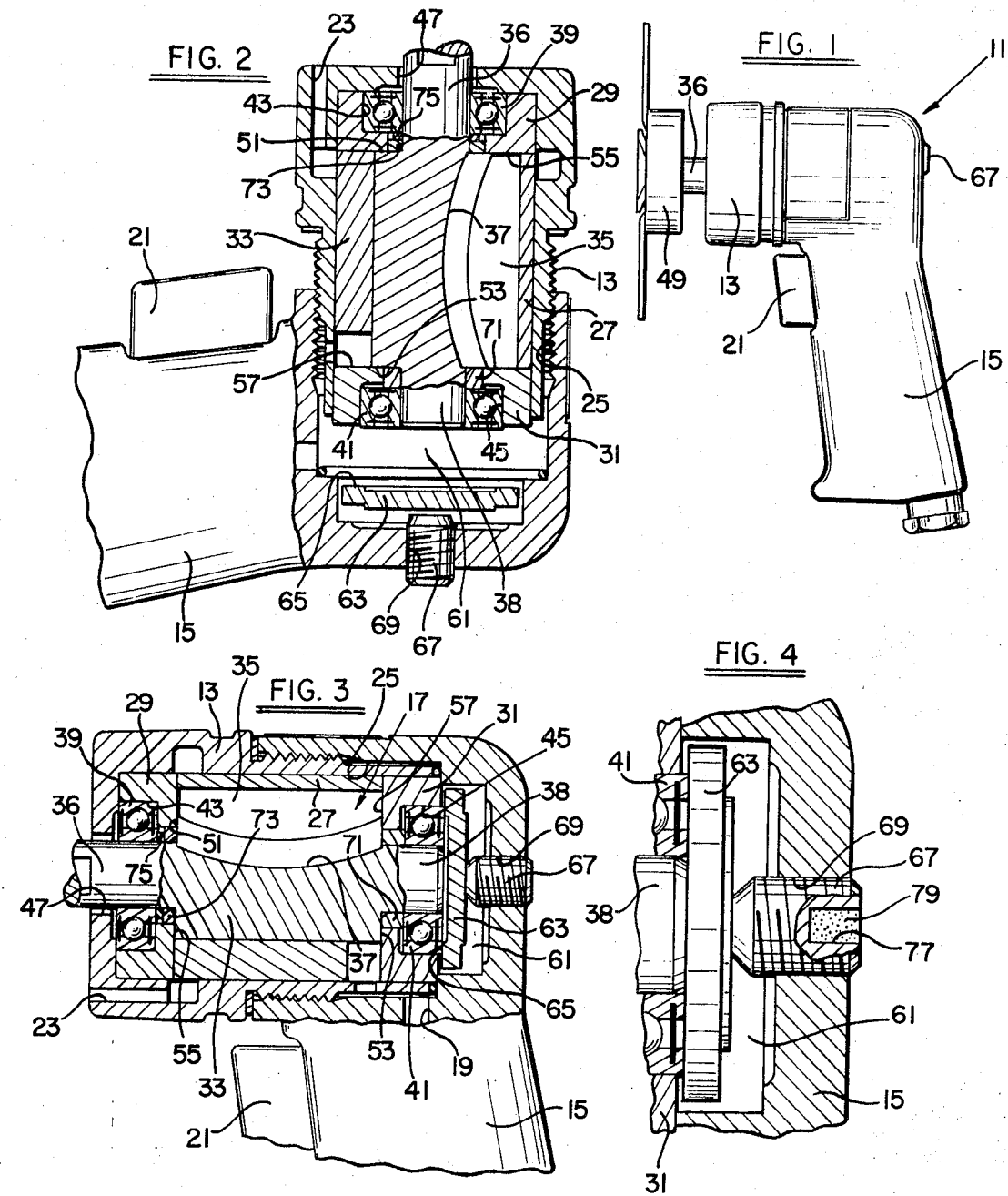
INVENTORS
WILLIAM W. CHAMBERS
DAVID J. HESTON
ATTORNEY

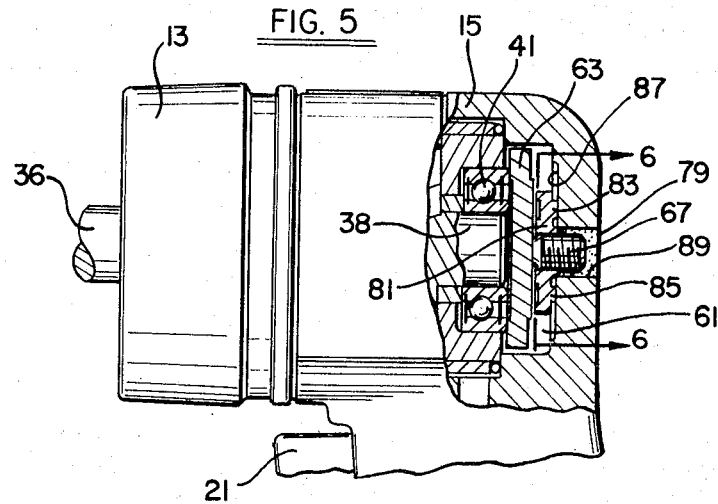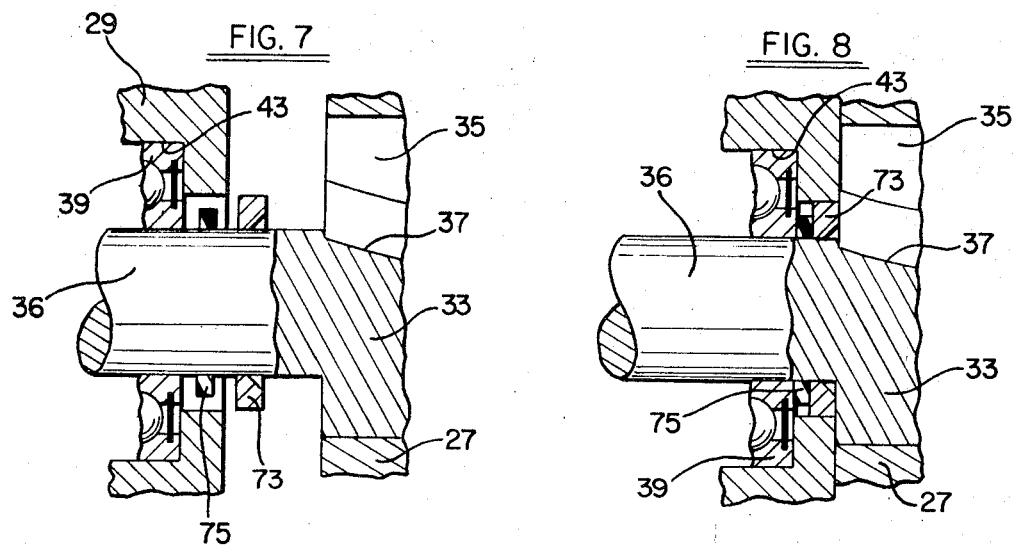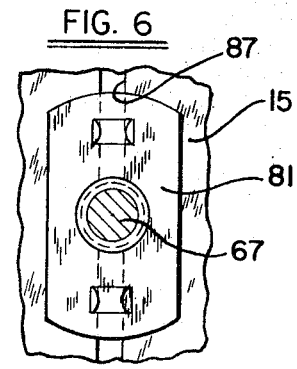

3,642,389

1

AIR MOTOR ROTOR ASSEMBLY

SUMMARY OF THE INVENTION

The present invention is directed to an improved air motor assembly which facilitates providing proper clearance between the rotor and end plates after assembly of the parts. The invention includes manually manipulatable means adapted to axially shift the rotor relative to the end plates. The invention obviates the need for maintaining difficult tolerances on the rotor end plates and on fit-up of the rotor bearings.

The main object of the present invention, therefore, is to provide an improved air motor rotor assembly which facilitates easily establishing proper axial clearance between the rotor and stationary end plates after assembly of the motor parts.

Further important objects of the present invention are to provide an improved assembly of the above character which minimizes the cost and difficulty of forming the various motor parts, and which is relatively easy and inexpensive to carry out and provides a durable and accurate assembly.

Other objects and advantages of the invention will become more apparent from a consideration of the detailed description to follow taken in conjunction with the drawings annexed hereto.

BRIEF DESCRIPTION OF THE DRAWINGS

FIG. 1 is a side elevational view illustrating a portable pneumatic tool embodying the present invention;

FIG. 2 is an enlarged view, partly in section, of a portion of FIG. 1 and illustrating the parts prior to complete assembly;

FIG. 3 is a view similar to FIG. 2 but showing the parts fully assembled;

FIG. 4 is an enlarged view of a portion of FIG. 3;

FIG. 5 is a view similar to FIG. 3 but showing a modified form of the invention;

FIG. 6 is an enlarged sectional view of FIG. 5 taken along the line 6—6 thereof;

FIG. 7 is a view illustrating the parts at the other end of the rotor of FIG. 5 prior to complete assembly; and FIG. 8 is a view similar to FIG. 7 but showing the parts fully assembled.

BROAD STATEMENT OF THE INVENTION

Broadly described, the present invention relates to a pneumatic motor comprising a cylinder closed at its ends by end plates, a rotor disposed for rotation within said cylinder, said rotor having radial end faces disposed in closely spaced, sliding relation to radial faces on said end plates, resilient means biasing said rotor in a first axial direction, and manually operable means including a rigid member outside said cylinder and operably abutting said rotor for axially adjusting said rotor in a second direction opposite said one direction, whereby to accurately position said rotor between said end plates.

In another aspect, the present invention relates to a rotary pneumatic device comprising a housing, a cylindrical liner fixed within said housing, end plates abutting said liner at opposite ends and defining therewith a motor cylinder, a rotor within said cylinder and having radial faces at opposite ends in closely spaced, confronting relation to respective radial faces on said end plates, a shaft fixed to said rotor, bearing means rotatably supporting said shaft within said housing, compressible means between one of said bearings and said rotor and normally biasing said rotor in one axial direction relative to said liner, manually operable means including a rigid member supported relative to said housing and operatively adjustably abutting said rotor and adapted to shift said rotor opposite said one axial direction relative to said liner, whereby to accurately position said rotor axially within said cylinder and said rotor end faces relative to said end plate faces.

2

DETAILED DESCRIPTION

Referring now more specifically to the drawings, a portable pneumatic device embodying the present invention is illustrated generally at 11 in FIG. 1 and is seen to include a rigid motor housing 13 and pendant handle 15. The motor housing 13 has a rotary pneumatic motor 17 disposed therein which is powered by compressed air delivered from a source through a passageway 19 in the handle 15 (see also FIG. 3). Airflow to the motor 17 is controlled by a valve trigger 21 on the handle 15 and is exhausted from the motor housing 13 by way of a passageway 23.

As shown in FIG. 3, the motor housing 13 is sleevelike in configuration and is threaded into an opening 25 in the handle 15. The motor 17 includes a cylindrical liner 27 pressed into the housing 13 with a pair of end plates 29, 31 piloted in the housing 13 and abutting opposite ends of the liner 27. A rotor 33, which includes one or more vanes 35 disposed in generally radially extending slots 37 therein, is rotatably disposed within the liner 27 and between the end plates 29, 31. The rotor 33 has fore-and-aft shaft section 36, 38 rotatably supported by ball bearings 39, 41 seated in bores 43, 45 in the end plates 29, 31, respectively. The shaft section 36 extends through an opening 47 in the front of the housing 13 and is adapted to be connected to tool means, here, a sanding-buffing head 49.

It will be appreciated that the axial position of the rotor 33 relative to the liner 27 and end plates 29, 31 is important. Thus, the rotor 33 has radial end faces 51, 53 at opposite ends thereof which are disposed in spaced, confronting face-to-face relation to radial faces 55, 57 on the end plates 29, 31, respectively. Motor efficiency dictates that clearance between these faces be minimal to keep air losses to a minimum; however, rubbing contact between these faces create friction losses which also are undesirable.

As a practical matter, the axial dimension of the liner 27 and the rotor 33 are closely controlled during manufacture. Thus, since the end plates 29, 31 are located by abutment with the ends of the liner 27, accurate axial positioning of the rotor 33 relative to the liner 27 provides the desired relationship between the end faces 51, 55 and 53, 57. One way to achieve this would be to accurately machine the bearing recesses 43, 45; however, the bearings 39, 41 themselves have manufacturing tolerances which often exceed that which is acceptable for the end faces of the rotor 33 and end plates 29, 31. In addition, this method requires an accurate (and expensive) fit-up of the bearings 39, 41 to the end plates 29, 31 and the rotor shaft portions 36, 38 during assembly, all of which contributes to the overall cost of the device. The present invention provides a different approach, i.e., one which allows a relatively easy, inexpensive and accurate fit-up of the parts after assembly without requiring expensive machining of all of these parts.

Thus, as shown in FIG. 3 and 4, the handle 15 has a recess 61 aligned with the bore 25. A pressure plate 63 is disposed within the recess 61 and has an annular lip 65 disposed to engage the outer, normally stationary race of the bearing 41. An adjustment screw 67 is threaded into an opening 69 in the handle 15 and is positioned to engage the pressure plate 63 substantially centrally thereof so that when the screw 67 is threaded inwardly of the recess 61, the pressure plate 63 pushes against and moves the bearing 41 toward the rotor 33.

The inner race of the bearing 41 is spaced from the rotor face 53 by a rigid, annular spacer 71. Similarly, the bearing 39 is spaced from the rotor face 51 by a rigid annular spacer 73 and a compressible, resilient ring 75. The spacer 73 and the ring 75 have a dimensional thickness such that when the parts are initially assembled, the rotor 33 is positioned with its end face 53 in engagement with the face 57 of the end plate 31 while the faces 51, 55 of the rotor 33 and end plate 29, respectively, are spaced from one another. Thereafter, the screw 67 is tightened to press the plate 63 against the bearing 41 which, in turn, transmits an axial thrust through the spacer 71, the rotor 33, and the spacer 73. This causes the resilient ring 75 to be compressed and allows the rotor 33 to move axially within the liner 27. When the rotor 33 has been moved sufficiently to separate the faces 53, 57, adjustment of the screw 67 is stopped. This may be determined by manually turning the rotor shaft 36 while the screw 67 is being adjusted. When the rotor shaft 36 turns freely, adjustment is complete. Desirably, the access opening 77 to the end of the screw 67 is then filled with, for example, a liquid solder 79 after adjustment is completed so that the device is tamper proof.

A modified form of the present invention is illustrated in FIG. 5-8. There, rather than the adjustment screw 67 being threaded into the handle 15, a nut 81 is provided within the recess 61 and is prevented from turning by projections 83, 85 which are received in a recess 87 in the handle 15. In addition, after adjustment is completed, liquid solder 79 or a similar material is used to fill either the opening 89 through which the screw 67 extends, or the access opening in the screw 67, to render the device tamper proof.

In all other respects, the device of FIGS. 5-8 is substantially the same as that illustrated in FIG. 1-4 and described above so that like numerals refer to like parts.

It will be appreciated that with the adjustment arrangement of the present invention, the rotor 33 is accurately located axially within the liner 27 and between the end plates 29, 31. This achieved without regard for accurate and expensive machining techniques on the end plates 29, 31 and bearing recesses 43, 45 therein and without regard for inherent tolerances in the bearings 39, 41. Thus, motor efficiency is maximized without contributing significantly to its cost.

While preferred embodiments of the present invention have been illustrated and described above in detail, various additions, substitutions, modifications and omissions may be made thereto without departing from the spirit of the invention.

We claim:

1. A pneumatic motor comprising a cylinder closed at its ends by end plates, a rotor disposed for rotation within said cylinder, said rotor having radial end faces disposed in closely spaced, sliding relation to radial faces on said end plates, resilient means biasing said rotor in a first axial direction, and manually operably means including a rigid member outside said cylinder and operably abutting said rotor for axially adjusting said rotor in a second direction opposite said one direction, whereby to accurately position said rotor between said end plates.

2. A motor as defined in claim 1 wherein said resilient means includes a compressible ring.

3. A motor as defined in claim 1 which includes bearing means within each said end plate, said rotor having fore-and-aft shaft sections rotatably supported by said bearing means, said resilient means being positioned between one of said bearing means and said rotor, said rigid member operably engaging one of said bearing means, whereby to transmit axial force through said rotor to the other of said bearing means in said second direction, whereby to shift said rotor in said second direction relative to said end plates.

4. A motor as defined in claim 3 wherein said bearing means includes a pair of ball bearings, said rigid member includes a pressure plate bearing axially against the outer race of one of said bearings and screw means accessible from outside said cylinder and operable to press said plate against said one bearing.

5. A motor as defined in claim 3 which includes a rigid annular spacer interposed between each said bearing means and said rotor.

6. A rotary pneumatic device comprising a housing, a cylindrical liner fixed within said housing, end plates abutting said liner at opposite ends and defining therewith a motor cylinder, a rotor within said cylinder and having radial faces at opposite ends in closely spaced, confronting relation to respective radial faces on said end plates, a shaft fixed to said rotor, bearing means rotatably supporting said shaft within said housing, compressible means between one of said bearings and said rotor and normally biasing said rotor in one axial direction relative to said liner, manually operable means including a rigid member supported relative to said housing and operatively adjustably abutting said rotor and adapted to shift said rotor opposite said one axial direction relative to said liner, whereby to accurately position said rotor axially within said cylinder and said rotor end faces relative to said end plate faces.

7. A device as defined in claim 6 wherein said rigid member includes a plate within said housing and bearing axially against one of said bearings and screw means biasing said plate toward said one bearing, whereby to shift said rotor axially relative to said liner.

8. A device as defined in claim 7 wherein said bearings include ball bearings having inner races on said shaft and outer races, said plate bearing against the outer race of said one bearing.

9. A device as defined in claim 7 wherein said screw means is threaded into said housing.

* * * * *